(12) United States Patent
McCaffrey et al.

(10) Patent No.: US 10,317,150 B2
(45) Date of Patent: Jun. 11, 2019

(54) STAGED HIGH TEMPERATURE HEAT EXCHANGER

(71) Applicant: United Technologies Corporation, Farmington, CT (US)

(72) Inventors: Michael G McCaffrey, Windsor, CT (US); Matthew A Devore, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 150 days.

(21) Appl. No.: 15/357,467

(22) Filed: Nov. 21, 2016

(65) Prior Publication Data

US 2018/0142971 A1 May 24, 2018

(51) Int. Cl.
*F28F 1/32* (2006.01)
*F28F 21/08* (2006.01)
(Continued)

(52) U.S. Cl.
CPC ............ *F28F 21/087* (2013.01); *F01D 25/12* (2013.01); *F02C 7/18* (2013.01); *F02K 3/115* (2013.01);
(Continued)

(58) Field of Classification Search
CPC ........ F28F 21/087; F28F 9/02; F28F 2265/00; F02C 7/18; F02K 3/115; F01D 25/12
(Continued)

(56) References Cited

U.S. PATENT DOCUMENTS 7,921,905 B2 * 4/2011 Baylis .................... B29C 65/02
165/172
2003/0141046 A1 * 7/2003 Ikeda .................. F28D 1/05366
165/173
(Continued)

FOREIGN PATENT DOCUMENTS

EP 2865981 4/2015
EP 3054256 8/2016
(Continued)

OTHER PUBLICATIONS

European Patent Office, European Search Report dated Apr. 17, 2018 in Application No. 17191899.8-1007.
(Continued)

*Primary Examiner* — Claire E Rojohn, III
(74) *Attorney, Agent, or Firm* — Snell & Wilmer, L.L.P.

(57) ABSTRACT

A staged high temperature heat exchanger (HEX) may comprise a first stage made from a first material and a second stage made from a second material. The first stage may comprise an inlet manifold configured to receive a flow of fluid. The second stage may comprise an outlet manifold whereby the flow of fluid exits the HEX. The first stage is configured to withstand the temperature of the flow of fluid entering the inlet manifold and configured to reduce the temperature of the flow of fluid to an intermediate temperature before the flow of fluid reaches the second stage. In various embodiments, the first material may comprise a nickel-based superalloy having at least 40% of a $Ni_3(Al,X)$ precipitate phase, X being a metallic or refractory element other than Al.

19 Claims, 5 Drawing Sheets

(51) Int. Cl.
  *F01D 25/12* (2006.01)
  *F28F 9/02* (2006.01)
  *F02K 3/115* (2006.01)
  *F02C 7/18* (2006.01)
  *F28D 1/053* (2006.01)
  *F28D 21/00* (2006.01)

(52) U.S. Cl.
  CPC ............ *F28F 9/02* (2013.01); *F05D 2220/32* (2013.01); *F05D 2250/75* (2013.01); *F05D 2260/213* (2013.01); *F05D 2300/175* (2013.01); *F05D 2300/177* (2013.01); *F05D 2300/1723* (2013.01); *F05D 2300/607* (2013.01); *F28D 1/05316* (2013.01); *F28D 1/05325* (2013.01); *F28D 2021/0026* (2013.01); *F28F 2265/00* (2013.01); *Y02T 50/675* (2013.01)

(58) Field of Classification Search
  CPC ......... F05D 2300/177; F05D 2300/607; F05D 2300/1723; F05D 2300/175; F28D 1/05325; F28D 2021/0026
  USPC ......................................................... 165/172
  See application file for complete search history.

(56) References Cited

U.S. PATENT DOCUMENTS

| | | | | |
|---|---|---|---|---|
| 2008/0219854 | A1* | 9/2008 | Devore | F01D 5/187 416/97 R |
| 2010/0276119 | A1* | 11/2010 | Doty | F28D 1/0477 165/104.31 |
| 2011/0209935 | A1* | 9/2011 | Nantais | B60K 11/04 180/68.4 |
| 2011/0286857 | A1* | 11/2011 | Gleiner | F01D 5/187 416/97 R |
| 2013/0236329 | A1* | 9/2013 | Devore | F01D 5/186 416/90 R |
| 2014/0014223 | A1* | 1/2014 | Hasko | D03D 23/00 139/35 |
| 2015/0114611 | A1* | 4/2015 | Morris | F02C 7/10 165/166 |
| 2016/0167112 | A1* | 6/2016 | Carr | B22C 1/00 415/115 |
| 2016/0186576 | A1* | 6/2016 | Thornton | F01D 5/186 415/115 |
| 2016/0231072 | A1* | 8/2016 | Pohlman | F28F 21/081 |
| 2016/0245595 | A1* | 8/2016 | Jang | F28F 9/02 |
| 2016/0381834 | A1* | 12/2016 | Harvilchuck | H05K 7/20636 312/236 |
| 2017/0010053 | A1* | 1/2017 | Shenoy | F22B 17/00 |
| 2017/0067354 | A1* | 3/2017 | McCaffrey | F01D 11/003 |
| 2017/0184030 | A1* | 6/2017 | Brousseau | B64D 13/08 |
| 2017/0204787 | A1* | 7/2017 | Duesler | F02C 7/14 |
| 2017/0205158 | A1* | 7/2017 | Eskew | F28F 9/013 |
| 2017/0226893 | A1* | 8/2017 | Slavens | F01D 5/187 |
| 2017/0241715 | A1* | 8/2017 | Ota | F25B 39/00 |
| 2017/0241722 | A1* | 8/2017 | Montestruc | F28F 27/02 |
| 2017/0268370 | A1* | 9/2017 | McCaffrey | B23P 15/00 |
| 2017/0268426 | A1* | 9/2017 | Duesler | F02C 7/32 |
| 2017/0276435 | A1* | 9/2017 | Papadopoulos | F01K 3/00 |
| 2017/0335704 | A1* | 11/2017 | Davis | F01D 11/005 |
| 2017/0370290 | A1* | 12/2017 | Bradbrook | F02C 3/04 |
| 2018/0030846 | A1* | 2/2018 | McCaffrey | F01D 11/22 |
| 2018/0038652 | A1* | 2/2018 | Dziubinschi | F28D 1/0443 |
| 2018/0051941 | A1* | 2/2018 | Army | F28D 9/0025 |
| 2018/0058765 | A1* | 3/2018 | Parfenov | F28D 9/0062 |
| 2018/0087841 | A1* | 3/2018 | Zhang | B23K 1/0012 |
| 2018/0094528 | A1* | 4/2018 | McCaffrey | F01D 5/082 |
| 2018/0126822 | A1* | 5/2018 | Nishino | B60H 1/32 |
| 2018/0128115 | A1* | 5/2018 | Hudson | F01D 5/186 |
| 2018/0135437 | A1* | 5/2018 | Propheter-Hinckley | B23P 15/04 |
| 2018/0135439 | A1* | 5/2018 | Devore | F01D 5/288 |
| 2018/0135453 | A1* | 5/2018 | Propheter-Hinckley | F01D 5/12 |
| 2018/0135900 | A1* | 5/2018 | Jindou | F25B 39/00 |
| 2018/0142971 | A1* | 5/2018 | McCaffrey | F01D 25/12 |

FOREIGN PATENT DOCUMENTS

| | | |
|---|---|---|
| EP | 3130781 | 2/2017 |
| EP | 3239493 | 11/2017 |
| WO | 2016012161 | 1/2016 |
| WO | 2016057443 | 4/2016 |

OTHER PUBLICATIONS

Special Metals: "inconel alloy 625", Aug. 13, 2013 (2813-88-81), XP855465665, Retrieved from the Internet: URL: http://www.specialmetals.com/assets/sm c/documents/alloys/inconel/inconel-alloy-6 25.pdf, pp. 1-18.

* cited by examiner

STAGED HIGH TEMPERATURE HEAT EXCHANGER

GOVERNMENT LICENSE RIGHTS

This disclosure was made with government support under FA 8626-16-C-2139 awarded by The United States Air Force. The government has certain rights in the disclosure.

FIELD

The present disclosure relates to gas turbine engines, and, more specifically, to heat exchangers (HEX) for cooling air of gas turbine engines.

BACKGROUND

As higher pressures are achieved in compressors of gas turbine engines, the temperature of compressed air in and/or leaving the compressors may increase as well. As a result, various components in a gas turbine engine may experience thermal stress. Thus, a heat exchanger (HEX) may be provided to cool hot air in a gas turbine engine.

SUMMARY

A high temperature heat exchanger (HEX) is disclosed herein, in accordance with various embodiments. A high temperature heat exchanger (HEX) may comprise an inlet manifold comprising a first material and configured to receive a flow of fluid, an outlet manifold comprising a second material whereby the flow of fluid exits the HEX, wherein the first material comprises a nickel-based super alloy.

The first material may comprise a single crystal alloy. The nickel-based superalloy may have at least 40% of a $Ni_3(Al,X)$ precipitate phase, X being a metallic or refractory element other than Al. The high temperature HEX may further comprise an intermediary manifold configured to couple the inlet manifold to the outlet manifold. The HEX may be at least partially located within a flow of bypass air configured to flow through a portion of the inlet manifold and a portion of the outlet manifold and remove heat from the flow of fluid. The intermediary manifold may comprise the first material. The intermediary manifold may comprise a "U" shape configured to turn the flow of fluid, the inlet manifold located upstream of the outlet manifold. The second material may comprise a nickel alloy.

A staged high temperature heat exchanger (HEX) is disclosed herein, in accordance with various embodiments. A staged high temperature heat exchanger (HEX) may comprise a first stage made from a first material comprising an inlet manifold configured to receive a flow of fluid, and a second stage made from a second material comprising an outlet manifold whereby the flow of fluid exits the HEX, wherein the first stage is configured to withstand a temperature of the flow of fluid entering the inlet manifold and configured to reduce the temperature of the flow of fluid to an intermediate temperature before the flow of fluid reaches the second stage.

In various embodiments, the first material may comprise a single crystal alloy. The first material may comprise a nickel-based superalloy having at least 40% of a $Ni_3(Al,X)$ precipitate phase, X being a metallic or refractory element other than Al. The intermediate temperature may comprise less than about 1,200° F. The staged high temperature HEX may further comprise an intermediary manifold configured to couple the inlet manifold to the outlet manifold. The HEX may be at least partially located within a flow of bypass air configured to flow through a portion of the inlet manifold and a portion of the outlet manifold and remove heat from the flow of fluid. The HEX may comprise a plurality of fins whereby heat is transferred from the HEX to the bypass air. The staged high temperature HEX may further comprise a spring element coupled between the inlet manifold and the outlet manifold.

A gas turbine engine is disclosed herein, in accordance with various embodiments. A gas turbine engine may comprise a staged high temperature heat exchanger (HEX) comprising a first stage made from a first material comprising an inlet manifold configured to receive a flow of fluid, and a second stage made from a second material comprising an outlet manifold whereby the flow of fluid exits the HEX, wherein the first stage is configured to withstand a temperature of the flow of fluid entering the inlet manifold and configured to reduce the temperature of the flow of fluid to an intermediate temperature before the flow of fluid reaches the second stage, and the first material comprises a nickel-based superalloy having at least 40% of a $Ni_3(Al,X)$ precipitate phase, X being a metallic or refractory element other than Al.

In various embodiments, the first material may comprise a single crystal nickel alloy. The temperature of the flow of fluid entering the inlet manifold may be between about 1,200° F. and about 1,800° F. The intermediate temperature may comprise less than about 1,200° F.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

A heat exchanger (HEX), as described herein, may comprise a first stage comprising a first material and a second stage comprising a second material. The first material may comprise a precipitation hardened nickel superalloy, including but not limited to single crystal alloys. The described first stage can reduce the temperature of a flow of fluid, such as a flow of air for example, to be cooled by the HEX to a temperature suitable for the second stage.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
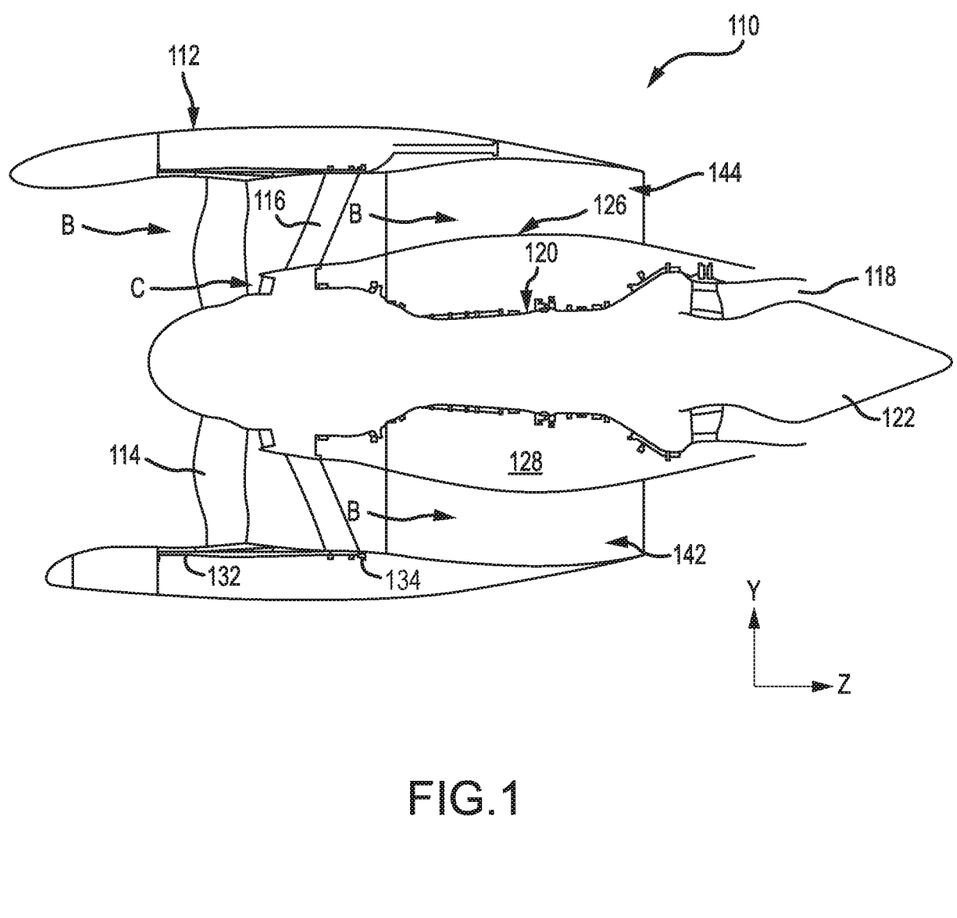
FIG. 1 illustrates a cross-sectional view of an exemplary gas turbine engine, in accordance with various embodiments.

FIG. 1 illustrates a schematic view of a gas turbine engine, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within nacelle 112.

Nacelle 112 typically comprises two halves which are typically mounted to a pylon. According to various embodiments, multiple guide vanes 116 may extend radially between core engine 120 and intermediary case (IMC) 134. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct, for example. Compressed air ducts may be under high pressure and may supply compressed air from a compressor stage to a turbine stage, for example.

Figure 2:
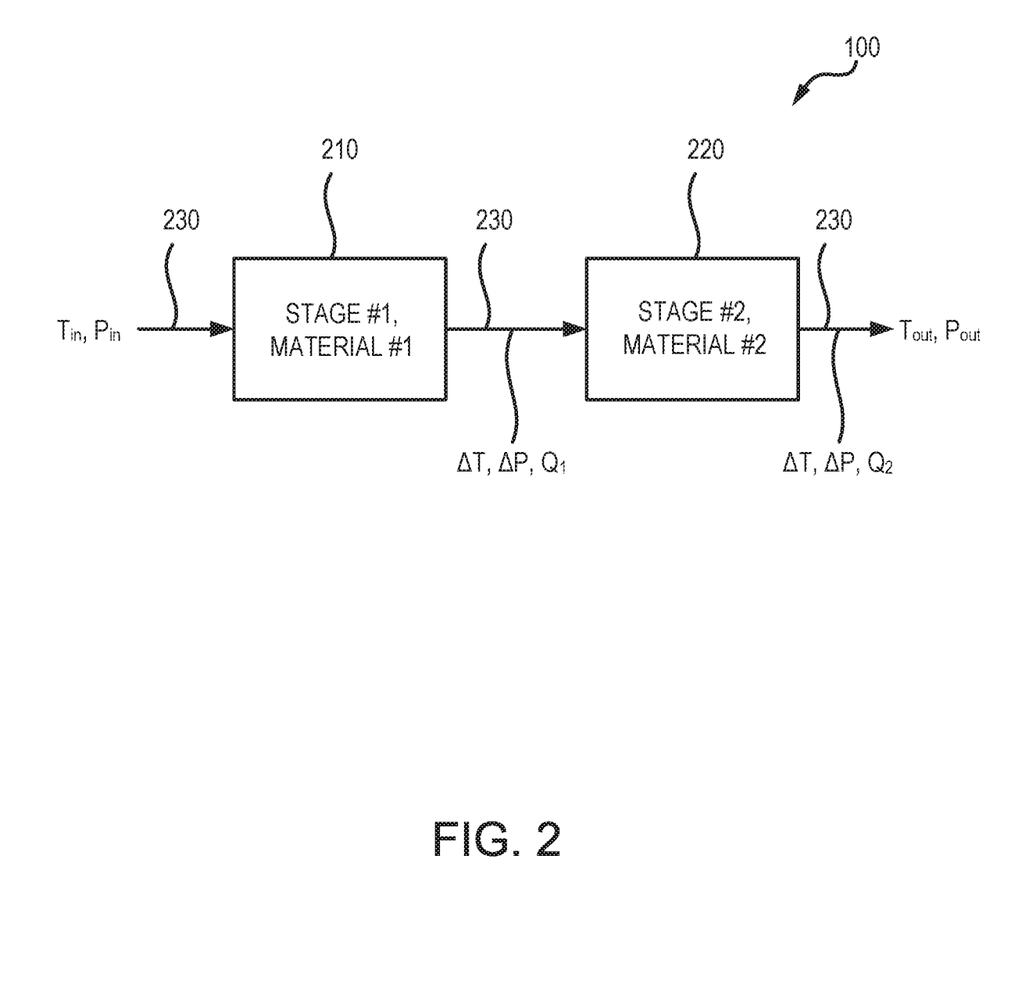
FIG. 2 illustrates a schematic view of a staged high temperature heat exchanger (HEX), in accordance with various embodiments.

With reference to FIG. 2, a staged, high temperature heat exchanger (HEX) 100 is illustrated, in accordance with various embodiments. HEX 100 may include first stage 210 and a second stage 220. First stage 210 may comprise a first material comprising a high temperature superalloy. In various embodiments, the superalloy is a nickel-based superally having at least 40% of a $Ni_3(Al,X)$ precipitate phase, where X is a metallic or refractory element other than Al. This is typically a gamma-prime phase, depending on the identity of X and the conditions under which the precipitate is formed. The superalloy can be formed as a single crystal. The superalloy may have increased creep strength in comparison to conventional nickel alloys. In this regard, the superalloy may comprise increased thermal and pressure resilience. In this regard, a first stage 210 comprising a superalloy may withstand temperatures of over 1200° F. (648.9° C.) and up to 1800° F. (982.2° C.) or more, at which temperatures a conventional nickel alloy would have inferior thermal and pressure properties.

Second stage 220 may comprise a second material, comprising a conventional nickel-based alloy, or an early-generation superalloy such as Waspaloy®, Haynes 25, or INCO 625. None of these can achieve gamma-prime precipitate levels of more than 25%. The lower level of gamma-prime precipitates in these alloys may simplify manufacturing methods but the alloys have less resilience to temperature and pressure, particularly as compared to newer superalloys used for other components (airfoils, disks, etc.). Thus as exposure to temperatures and pressure differentials increase, e.g., temperatures beyond 1200° F. (649° C.), a conventionally formed heat exchanger may more quickly break down due to creep, fatigue, etc., allowing leakage and necessitating frequent replacement, or may require large wall thickness to deal with thermal loading and pressure loading, which may lead to creep and stress rupture. Thus, a first stage comprising the first material, or superalloy, may result in increased thermal and pressure resilience, as well as weight savings and decreased size.

In various embodiments, first stage 210 may receive a flow of fluid 230 comprising an inlet temperature $T_{in}$ and an inlet pressure $P_{in}$. The temperature $T_{in}$ of the flow of fluid 230 may decrease across first stage 210. The pressure $P_{in}$ of the flow of fluid 230 may decrease across first stage 210. The flow of fluid 230 may then enter the second stage 220. The temperature of the flow of fluid 230 may decrease across second stage 220. The pressure of the flow of fluid 230 may decrease across second stage 220. With combined reference to FIG. 1 and FIG. 2, gas turbine engine 110 may include HEX 100. HEX 100 may be located within a bypass flow path, such as bypass flow path B. Although described with reference to a bypass turbofan engine (i.e., gas turbine engine 110), HEX 100 may be included in other turbine engine applications, such as turbojet engines for military aircraft.

Figure 3:
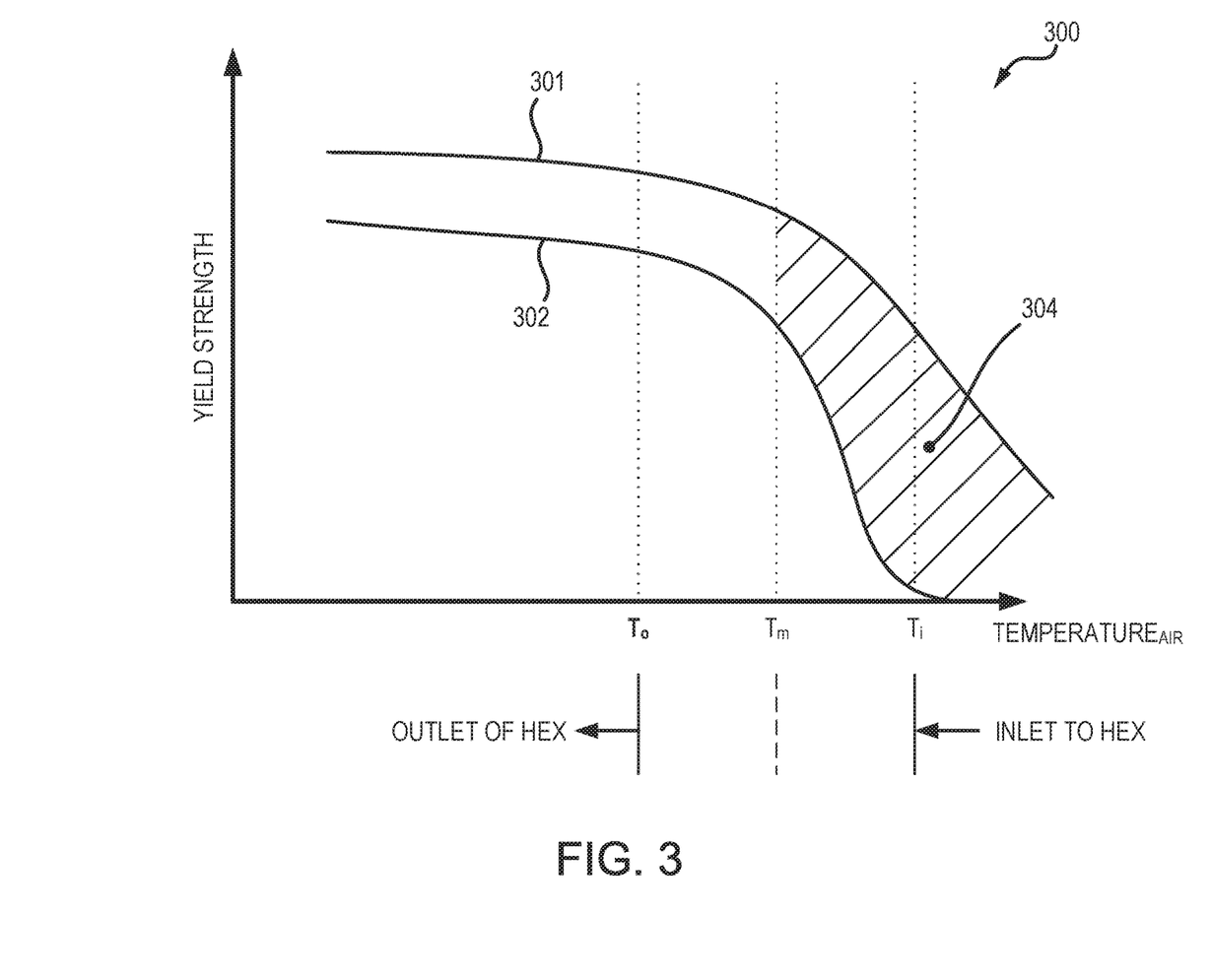
FIG. 3 illustrates a plot of yield strength versus temperature of a first material and a second material, in accordance with various embodiments.

With reference to FIG. 3, a plot 300 of the yield strength of a first material and a second material versus temperature is illustrated, in accordance with various embodiments. Line 301 represents the yield strength of the first material. Line 302 represents the yield strength of the second material. The yield strength of the first material may be greater than the yield strength of the second material at an inlet temperature $T_i$. As illustrated in FIG. 3, the yield strength of the second material may not be sufficient to withstand pressure and thermal stress at inlet temperature $T_i$. In various embodiments, the inlet temperature $T_i$ may be greater than about 1100° F. (593.3° C.), and in various embodiments, greater than about 1200° F. (648.9° C.), and in various embodiments, greater than about 1300° F. (704.4° C.), wherein the term "about" in this regard means ±50° F. (±27.8° C.). With combined reference to FIG. 2 and FIG. 3, the flow of fluid 230 may decrease in temperature as it passes through first stage 210 until it reaches intermediate temperature $T_m$. In various embodiments, the intermediate temperature $T_m$ may be less than about 1200° F. (648.9° C.), and in various embodiments, less than about 1100° F. (593.3° C.), and in various embodiments, less than about 1000° F. (537.8° C.), wherein the term "about" in this regard means ±50° F. (±27.8° C.). The yield strength of the second material may be sufficient to withstand pressure and thermal stress at intermediate temperature $T_m$. The flow of fluid 230 may decrease in temperature as it passes through second stage 220 until it reaches outlet temperature $T_o$. In this regard, shaded region 304 represents a region of additional beneficial strength of HEX 100 in comparison to conventional heat exchangers. Therefore, providing a first stage 210 capable of withstanding higher temperatures, may allow for the HEX 200 to provide cooling to a flow of fluid 230 comprising high temperatures (e.g., temperatures greater than about 1200° F. (648.9° C.)). Furthermore, the wall thickness of a staged HEX 200 may be less than the wall thickness of a conventional heat exchanger and thus the overall weight of HEX 200 may be less than a conventional heat exchanger.

Figure 4A:
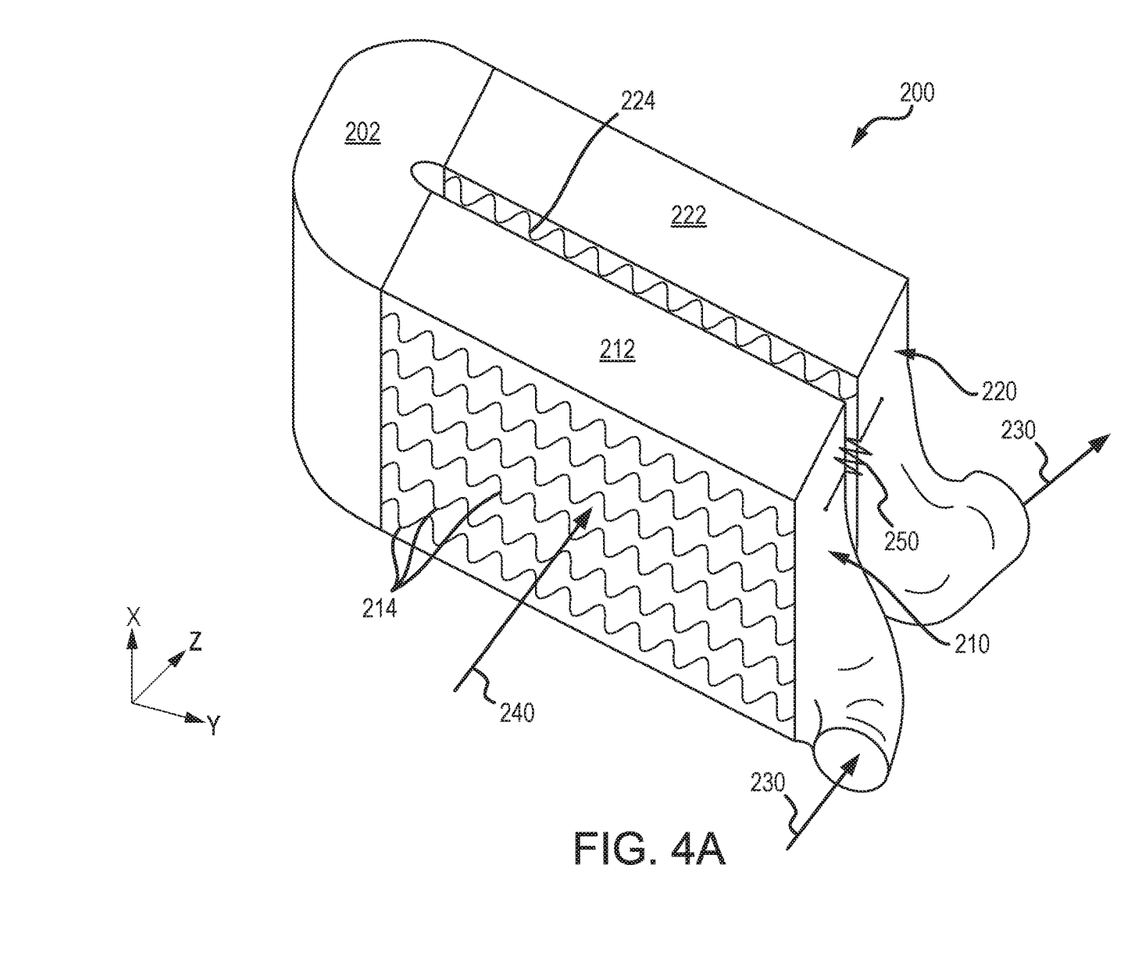
FIG. 4A illustrates a perspective view of a staged high temperature HEX, in accordance with various embodiments.
Figure 4B:
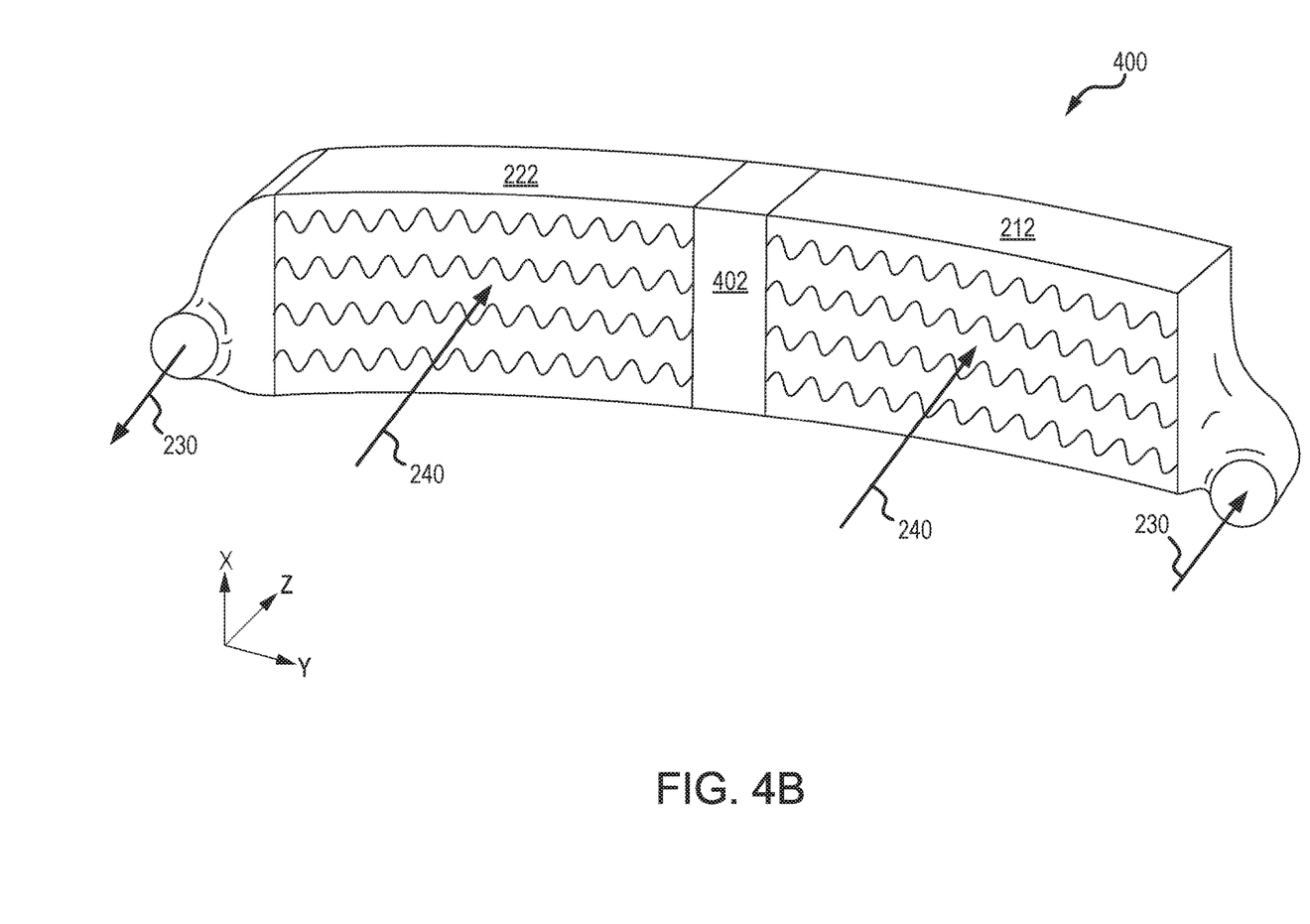
FIG. 4B illustrates a perspective view of a staged high temperature HEX, in accordance with various embodiments.

With respect to FIG. 4A and FIG. 4B, elements with like element numbering as depicted in FIG. 2 are intended to be the same and will not necessarily be repeated for the sake of clarity.

With reference to FIG. 4A, a perspective view of a staged, high temperature heat exchanger (HEX) 200 is illustrated, in accordance with various embodiments. HEX 200 may comprise a first stage 210 and a second stage 220. First stage 210 may comprise an inlet manifold 212. Second stage 220 may comprise an outlet manifold 222. In various embodiments, inlet manifold 212 may be coupled to outlet manifold 222 via an intermediary manifold 202. In various embodiments, intermediary manifold 202 may comprise a "U" shape. However, intermediary manifold 202 may comprise any suitable geometry. HEX 200 may receive a flow of fluid 230 at inlet manifold 212. The flow of fluid 230 may exit inlet manifold 212 into intermediary manifold 202. Flow of fluid 230 may be turned by intermediary manifold 202 and exit into outlet manifold 222. Flow of fluid 230 may flow through outlet manifold 222 and exit outlet manifold 222. The flow of fluid 230 exiting the outlet manifold 222 may be cooler than the flow of fluid 230 entering the inlet manifold 212. In this regard, HEX 200 may be positioned at least partially within a flow of bypass air 240. Bypass air 240 may comprise a temperature substantially lower than the temperature of the flow of fluid 230. Inlet manifold 212 may be configured to transfer heat from flow of fluid 230 to bypass air 240. In this regard, bypass air 240 may flow over a portion of HEX 200 to remove heat from flow of fluid 230. In various embodiments, bypass air 240 may flow over plurality of fins 214 of inlet manifold 212, whereby heat is transferred from flow of fluid 230. Similarly, bypass air 240 may continue to flow over plurality of fins 224 of outlet manifold 222, whereby heat is transferred from flow of fluid 230. Thus, outlet manifold 222 may be configured to transfer heat from flow of fluid 230 to bypass air 240.

In various embodiments, a spring element 250 may be coupled between inlet manifold 212 and outlet manifold 222. Spring element 250 may allow for movement (in the z-direction) of inlet manifold 212 relative to outlet manifold 222, for example during thermal expansion and/or contraction of inlet manifold 212 and/or outlet manifold 222. Spring element 250 may provide structural support between inlet manifold 212 and outlet manifold 222. In various embodiments, spring element 250 may comprise a leaf spring, a coil spring, a beam spring, or other compliant connection. In various embodiments, spring element 250 may comprise metal. In various embodiments, spring element 250 may comprise sheet metal.

In various embodiments, inlet manifold 212 may comprise the first material. In various embodiments, plurality of fins 214 may comprise the first material. In various embodiments, outlet manifold 222 may comprise the second material.

With reference to FIG. 4B, a HEX 400 is illustrated, in accordance with various embodiments. HEX 400 may be similar to HEX 200, with momentary reference to FIG. 2, except that inlet manifold 212 and outlet manifold 222 may be disposed in the same plane (i.e., the xy-plane of FIG. 4B) normal to the flow of bypass air 240. In this regard, intermediary manifold 402 may couple inlet manifold 212 to outlet manifold 222. In various embodiments, intermediary manifold 402 may comprise the first material. In various embodiments, intermediary manifold 402 may comprise the second material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An air-to-air high temperature heat exchanger (HEX) for a gas turbine engine, comprising:
    an inlet manifold comprising a first material and configured to receive a first flow of air;
    an outlet manifold comprising a second material whereby the first flow of air exits the HEX,
    wherein the first material comprises a nickel-based super alloy and the second material comprises a nickel alloy;
    the inlet manifold is configured to reduce a temperature of the first flow of air from greater than about 1,200° F. to less than about 1,200° F., wherein heat from the first flow of air is transferred, via the inlet manifold, to a second flow of air flowing over at least a portion of the inlet manifold.

2. The high temperature HEX of claim 1, wherein the first material comprises a single crystal alloy.

3. The high temperature HEX of claim 2, wherein the nickel-based superalloy has at least 40% of a $Ni_3(Al,X)$ precipitate phase, X being a metallic or refractory element other than Al.

4. The high temperature HEX of claim 1, further comprising an intermediary manifold configured to couple the inlet manifold to the outlet manifold.

5. The high temperature HEX of claim 3, wherein the HEX is at least partially located within a flow of bypass air configured to flow over a portion of the inlet manifold and a portion of the outlet manifold and remove heat from the first flow of air, wherein the second flow of air comprises the flow of bypass air.

6. The high temperature HEX of claim 4, wherein the intermediary manifold comprises the first material.

7. The high temperature HEX of claim 6, wherein the intermediary manifold comprises a "U" shape configured to turn the first flow of air, the inlet manifold located upstream of the outlet manifold.

8. An air-to-air, staged high temperature heat exchanger (HEX) for a gas turbine engine, comprising:
    a first stage made from a first material comprising:
        an inlet manifold configured to receive a first flow of air; and
    a second stage made from a second material comprising:
        an outlet manifold whereby the first flow of air exits the HEX,
    wherein the first stage is configured to withstand a temperature of the first flow of air entering the inlet manifold and configured to reduce the temperature of the first flow of air to an intermediate temperature before the first flow of air reaches the second stage;
    wherein the first material comprises a nickel-based super alloy and the second material comprises a nickel alloy;
    the inlet manifold is configured to reduce a temperature of the first flow of air from greater than about 1,200° F. to less than about 1,200° F., wherein heat from the first flow of air is transferred, via the inlet manifold, to a second flow of air flowing over at least a portion of the inlet manifold.

9. The staged high temperature HEX of claim 8, wherein the first material comprises a single crystal alloy.

10. The staged high temperature HEX of claim 9, wherein the first material comprises at least 40% of a $Ni_3(Al,X)$ precipitate phase, X being a metallic or refractory element other than Al.

11. The staged high temperature HEX of claim 10, wherein the intermediate temperature comprises less than about 1,200° F.

12. The staged high temperature HEX of claim 10, further comprising an intermediary manifold configured to couple the inlet manifold to the outlet manifold.

13. The staged high temperature HEX of claim 12, wherein the HEX is at least partially located within a flow of bypass air configured to flow through a portion of the inlet manifold and a portion of the outlet manifold and remove heat from the first flow of air, wherein the second flow of air comprises the flow of bypass air.

14. The staged high temperature HEX of claim 13, wherein the HEX comprises a plurality of fins whereby heat is transferred from the HEX to the flow of bypass air.

15. The staged high temperature HEX of claim 12, further comprising a spring element coupled between the inlet manifold and the outlet manifold.

16. A gas turbine engine comprising:
    an air-to-air, staged high temperature heat exchanger (HEX), comprising:
        a first stage made from a first material comprising:
            an inlet manifold configured to receive a first flow of air; and
        a second stage made from a second material comprising:
            an outlet manifold whereby the first flow of air exits the HEX,
        wherein the first stage is configured to withstand a temperature of the first flow of air entering the inlet manifold and configured to reduce the temperature of the first flow of air to an intermediate temperature before the first flow of air reaches the second stage, and
        the first material comprises a nickel-based superalloy having at least 40% of a $Ni_3(Al,X)$ precipitate phase, X being a metallic or refractory element other than Al;
        the inlet manifold is configured to reduce a temperature of the first flow of air from greater than about 1,200° F. to less than about 1,200° F., wherein heat from the first flow of air is transferred, via the inlet manifold, to a second flow of air flowing over at least a portion of the inlet manifold.

17. The gas turbine engine of claim 16, wherein the first material comprises a single crystal nickel alloy.

18. The high temperature HEX of claim 1, wherein the second flow of air comprises a flow of bypass air.

19. The high temperature HEX of claim 1, wherein the first flow of air comprises a flow of compressed air from a compressor stage of the gas turbine engine.

* * * * *